Patented Sept. 23, 1952

2,611,713

UNITED STATES PATENT OFFICE 2,611,713

CONCRETE SURFACE SEALER

Alvin G. Glick, Anoka, Minn., assignor to Akona Chemical Corporation, Anoka, Minn., a corporation of Minnesota No Drawing. Application June 23, 1950,
Serial No. 170,029

3 Claims. (Cl. 106—95)

This invention relates to a concrete sealer for cement walls.

It has long been a problem in the concrete industry to successfully seal the pores with a durable substantially permanent sealer to prevent moisture from seeping through the wall. This is true of poured concrete walls as well as walls constructed of concrete blocks. Formerly, asphalt was spread over the wall, particularly on the outside thereof, before the ground was backfilled around the wall, but after several years the asphalt hardened and cracked and thus permitted leakage therethrough.

It is an object of my invention to provide a permanent sealer for concrete, particularly adapted for use in concrete walls to prevent seepage of water therethrough.

It is another object to provide a sealer in the form of an easily applied paint mixture which will dry to form a permanent seal on the cement surface and which will securely bond itself to the wall and form a substantially homogeneous unit therewith.

It is still another object to provide a sealer paint adapted to be manufactured in a powdered form and mixed with water for use and which when spread on a concrete surface will penetrate a substantial distance into the concrete by a suction produced therewith and form a nondusting, substantially integral surface with said concrete.

These and other objects of my invention will be more apparent from the following detailed description.

After long experimentation and much revision of formulas, applicant finally arrived at the preferred proportional limits of the component parts, to wit: 75% to 85% Portland cement; 8% to 12% hydrated lime; 2½% to 3½% sodium chloride; 1% calcium stearate; 2½% to 3½% zinc sulphate. I have found that these limits must be maintained if a waterproof easily mixed sealer is to be produced which will not powder off after completion of the curing reaction. If the sealer is to be applied with a brush the following proportions have been found to produce the best results: 80% Portland cement; 10% hydrated lime; 3% silica sand; 3% sodium chloride; 1% calcium stearate; 3% zinc sulphate.

The sodium chloride and zinc sulphate are initially milled and added to the hydrated lime which in turn is added to the Portland cement and silica sand, if used. Thereafter, the calcium stearate is added, and if colors are desired, pigments are added to the mixture. When all of the ingredients have been added, the dry mixture is intermixed for a period of not less than twelve minutes and is then packed in shipping containers.

When the sealer is to be used, water is added to the mixture and the paint formed thereby is spread on the wall with a wide brush or spray gun. The silica sand can not be used if the sealer is to be sprayed because of its deleterious effects on the spray gun.

The Portland cement is used for a bonding base and maintains a permanent bond between the concrete surface and the paint. The silica sand improves the surface hardness and the durability and insures excellent adhesion between the successive coats. The calcium stearate is water repellent and reduces the amount of chipping and cracking and adds workability to the paint. The hydrated lime also provides workability and increases the miscibility of the calcium stearate and shortens the time for proper mixing with water and materially increases the durability of the coating when exposed to excessive moisture. The zinc sulphate makes the paint easy to spread and the sodium chloride helps keep the paint wet for several days due to its deliquescence and aids in the curing of the sealer. After application of the sealer to the wall it is believed that a chemical reaction takes place between the components of the sealer and also between the sealer and the old wall. It has been found that completion of this reaction takes from five to ten days, depending upon the temperature and moisture in the air, and it is important that the sealer remains damp during this period. Therefore, a deliquescent salt, such as sodium chloride, which has been found to produce the best results, is used to maintain the moisture content during the curing reaction. The concrete surface to which the sealer is being applied must be free from foreign materials which would prevent the suction created from drawing the sealer into the pores of the cement.

The results obtained with this sealer have been extremely satisfactory through the extensive experiments that have been conducted, and after a thorough curing a waterproof surface which penetrates a substantial distance into the concrete is produced which is substantially permanent and which will seal the wall against water penetration. It should also be noted that my improved sealer can be used on the inside surface, and because it will not dust off provides substantially permanent color paint for inside wall surfaces which can also be painted with a subsequent coat of conventional oil paint.

It will be seen from the foregoing description that I have provided an extremely effective, easy to apply, permanent sealer for concrete surfaces, particularly adapted for use on concrete walls to seal the same against moisture penetration.

It will, of course, be understood that various changes may be made in the proportions of the parts without departing from the scope of my invention, which, generally stated, consists in the matter shown and described, and set forth in the appended claims.

What I claim is:

1. A sealer for concrete surfaces comprising a dry mixture consisting in from 75% to 85% Portland cement, 8% to 12% hydrated lime, 2½% to 3½% zinc sulphate, 2½% to 3½% deliquescent chemical composition, and 1% calcium stearate, said mixture adapted to have water added thereto to produce a fluid paste for application to a concrete surface to waterproof said surface.

2. A concrete sealer comprising a dry mixture consisting in from 75% to 85% Portland cement, 8% to 12% hydrated lime, 2½% to 3½% zinc sulphate, 2½% to 3½% sodium chloride, and 1% calcium stearate, said mixture being adapted to have water added thereto to produce a semi liquid paint for application to a concrete surface to waterproof the same.

3. A sealer for cement surfaces comprising as dry ingredients thereof from 75% to 85% Portland cement, 8% to 12% hydrated lime, 2½% to 3½% zinc sulphate, and substantially 1% calcium stearate, said sealer being adapted to have water added thereto for application to a concrete surface followed by complete hydration and curing thereof to effect water-proofing of said concrete surface.

ALVIN G. GLICK.

REFERENCES CITED

The following references are of record in the file of this patent:

UNITED STATES PATENTS

| Number | Name | Date |
|---|---|---|
| 1,749,923 | Reardon | Mar. 11, 1930 |
| 2,032,071 | Scholz | Feb. 25, 1936 |
| 2,246,620 | Comeau | June 24, 1941 |